June 6, 1939. L. F. SARNES 2,161,777
MIRROR ASSEMBLY FOR AN AUTOMOBILE BODY
Filed Sept. 21, 1938
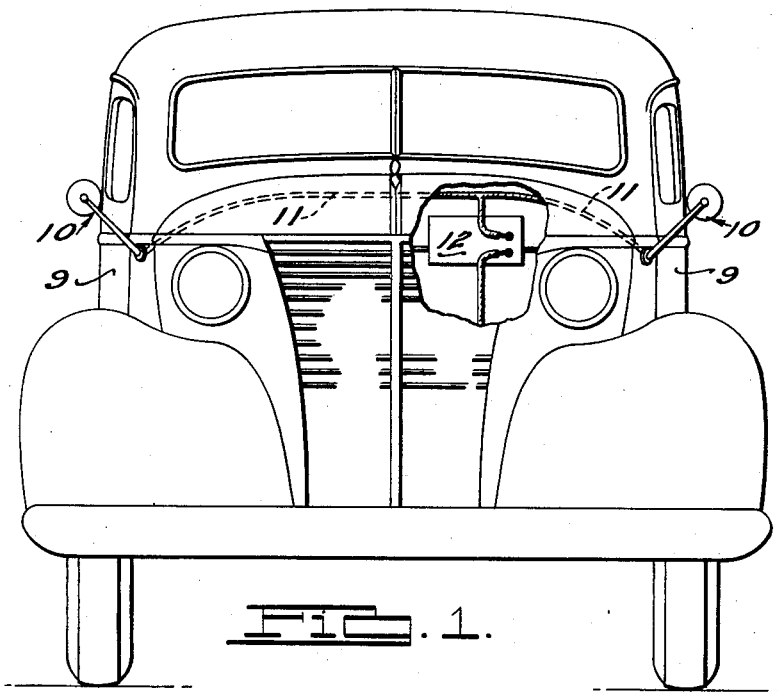
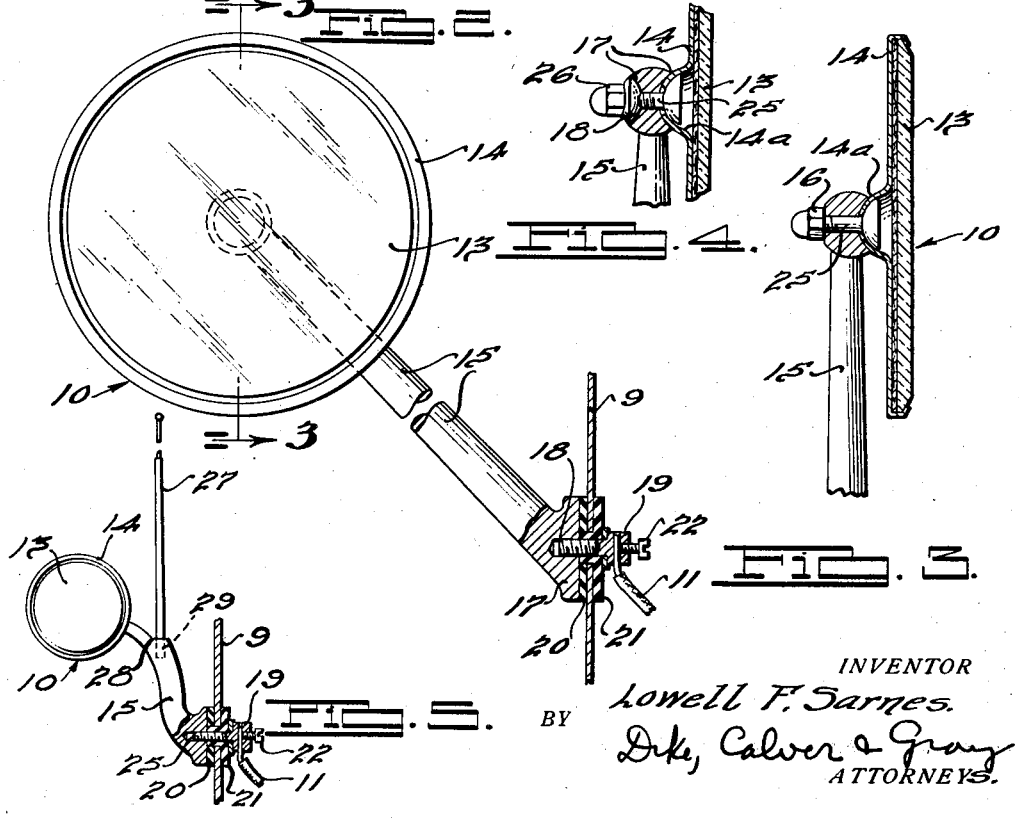
INVENTOR
Lowell F. Sarnes.
BY Dike, Calver & Gray
ATTORNEYS.

Patented June 6, 1939

2,161,777

UNITED STATES PATENT OFFICE 2,161,777

MIRROR ASSEMBLY FOR AN AUTOMOBILE BODY

Lowell F. Sarnes, Detroit, Mich., assignor to Monarch Governor Company, Detroit, Mich., a corporation of Michigan Application September 21, 1938, Serial No. 230,924

4 Claims. (Cl. 250—33)

The present invention relates to an improved antenna assembly for a radio. More particularly, the invention relates to an antenna for a radio receiving set carried by or installed within a motor vehicle, such as an automobile, and utilizes the metallic portions of one or more mirrors mounted thereupon as the receiving surface of the antenna.

It is well known to those familiar with the structure of automobile bodies that the relatively recent all steel structure thereof, especially of the upper portion, has prevented the use of built-in interior antennas for automobile radios. Such a structure hampers or interferes with reception if antennas of this type be employed not only by shielding them from the radio waves but also by grounding the antennas, since the said top is included as a part of the frame of the vehicle, and, therefore, of the ground circuit of the radio. In order to overcome these objections antennas of several types have been introduced, such, for example, as the telescopic whip type which extends above the top of the body, the suction cup type which is fixed along the outer surface of the roof, and the projecting rod type which is fastened to a fender or the like and extends upwardly usually to a relatively great height.

Each type of antenna has serious disadvantages, however. Those that project above the top of the body are subject to being damaged or broken by the careless or negligent operation of a driver in directing the automobile under low door casings, bridges, or the like. Moreover, in order to avoid damage of this character antennas of this type are often made swingable or lowerable which necessitates an inconvenient manual operation by an occupant or driver of the vehicle. Besides they are unsightly. Antennas which are fixed to the top of the roof or in some equally exposed position are cumbersome, also unsightly, and in addition are subject to excessive deterioration due to their exposed position and especially because of excessive wear of the rubber suction cups utilized to fix them in place.

It is a principal object of the present invention to obviate the above mentioned disadvantages and to provide, as a means for so doing, an antenna which utilizes as its wave receiving area the metallic portions of one or more mirrors mounted upon the outsde of the vehicle body.

It is another object of the invention to provide an antenna for use on a vehicle, which antenna is not shielded by the body of the vehicle despite the various positions which may be assumed.

It is a further object of the invention to provide an antenna of the above character which is easily installed, one which is compact in structure, attractive in appearance, and adapted to be installed upon a conventional vehicle body.

Still another object of the invention is to provide one or more rear view mirrors to be utilized in part as an antenna and thereby to provide a combined mirror and antenna assembly so that safety in operation of the vehicle is encouraged while at the same time an antenna is being supplied.

Other objects of this invention will appear in the following description and appended claims, reference being had to the accompanying drawing forming a part of this specification wherein like reference characters designate corresponding parts in the several views.

Fig. 1 is a view in perspective of an automobile body with parts broken away showing one form of the invention applied thereto.

Fig. 2 is a longitudinal section of a portion of a vehicle body showing the application of a rear view mirror thereto and indicating one form of the present invention.

Fig. 3 is a fragmentary view in longitudinal section of the form of the invention shown in Fig. 2 and is taken along lines 3—3 of Fig. 2.

Fig. 4 is a view similar to Fig. 3 but indicating a modified means for attaching the reflecting surface to its support.

Fig. 5 is a view generally similar to Fig. 2 but depicting a modified form of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, and particularly to Figs. 1 to 4 inclusive, one form of mirror and an antenna assembly embodying the present invention is there shown in one of its applications, namely, as applied to the exterior of an automobile body 9. The present form of the invention is shown as a whole in Fig. 1 and is applied, as there illustrated, to the outer face of the forward portion or cowl panel of an automobile body in advance of the hinged front door. However, the aforesaid assembly may be applied to a door pillar or to any convenient and suitable place on the outer surface of the vehicle body. This assembly comprises, in general, a mirror indicated generally by the reference numeral 10 having a conventional metallic backing portion and bracket, which portions also serve as the wave receiving surface of my antenna. To the mirror 10 is connected a lead-in wire 11 which is adapted to connect the mirror to a radio receiving set indicated generally by the numeral 12. It is to be understood, however, that more than one mirror may be utilized in which event the lead-in wire 10, 10 as well as to connect them with the radio 12.

Except in the ways expressly pointed out hereinafter the mirror 10 may be of any type, construction, and design so long as it possesses metallic portions. However, such construction conventionally includes a silvered glass 13 or some other reflecting surface, which member is encased within and held in place by a metallic backing or plate 14 having an inwardly turned flange which is adapted to grip the said member as shown in Fig. 3. The plate 14 is fixed to a metallic bracket 15 preferably by pivotal means, such as that provided by the nut and bolt assembly indicated generally by the numeral 16 (Fig. 3) so that the position of the reflecting surface is made adjustable.

However, a preferred means for pivotally mounting the mirror is shown in Fig. 4. As there shown, the upper end portion or head of the bracket 15 is provided at each of its oppositely disposed lateral faces with generally concave cup-like indentures or recesses 17, 17. These recesses 17, 17 are substantially identical in size and shape and are adapted to receive interchangeably not only the convex socket portion 14a of the mirror backing 14 but also a correspondingly shaped convex washer 18. The socket 14a of the mirror backing may be inserted in either indenture or recess 17 and is held in place by suitable means, such as a bolt 25 carrying a semi-spherical ball portion 25a confined within the socket 14a to permit limited universal movement. The parts are clamped in any adjusted position of the mirror by a nut 26 threaded onto the end of the bolt 25. From the foregoing it will be seen that the same arm 15 may be used at either side of the car body and the mirror may be attached to the arm in any position thereof simply by reversing its position from one side of the arm to the other and reversing the connecting parts 18, 25 and 26. The mirror is thus interchangeable with arms attachable at either the left or right hand sides of the car body. It will be understood that instead of a separate convex washer 18 the latter may be made integral with the nut 26. The bracket 15 is firmly secured to, or integrally formed from, a base portion 17 (Fig. 2) which is adapted to secure the entire mirror unit to a vehicle body.

It is to be understood, however, that the above structure, as such, is but illustrative of one application of the present invention and that any mirror assembly is operative and may be employed so long as it contains metallic portions similar in a general way to those described.

The mirror assembly 10 is secured to the vehicle body 9 by any suitable means, such as the bolt 18 which fits through an appropriate opening in the said body, such as the front pillar or door post thereof. The bolt 18 possesses a relatively large head 19 which forms a shoulder so that the said bolt may be threaded into the base 17, as shown, and clamp the same and, consequently, the entire mirror assembly firmly in place. It is to be understood however, that other means suitable to so fasten the mirror assembly in place may be utilized. However, such fastening means as well as the mirror assembly itself is insulated from the body 9. In the form of the invention depicted in the drawing, the base 17 and bolt 18 are so insulated by means of the insulating pads 20 and 21 which are preferably formed from resilient material, such as rubber or the like, thereby serving as cushions as well as insulators. These pads 20 and 21 are inserted between the base 17 and body 9 and also between the latter and the bolt 18 as clearly illustrated in Fig. 2. Naturally, these pads are positioned as shown before the mirror assembly 10 is clamped in place, the latter being installed upon them thereafter.

The head 19 of the bolt 18 is drilled as shown and, in addition, a setscrew 22 is appropriately threaded therein. This structure allows the end of the lead-in wire 11 to be inserted within the bolt 18 and held in place by a tightening of the setscrew 22. While such a structure is to be preferred since a solderless connection is provided thereby, any fastening means, such as soldering or the like, suitable to firmly hold the end of the lead-in wire in contact with the fastening element of the mirror assembly, may be utilized always provided that the said connection ensures an electrical conducting union of the wire 11 with the metallic portions of the mirror 10 and is insulated from the body 9 in some manner equivalent to that explained above. The lead-in wire 11 is secured by suitable means to appropriate supporting portions of the vehicle and interconnects the mirrors 10, 10 as well as connecting them to the radio 12 in the manner shown, particularly in Fig. 1.

A modified form of the present invention is shown in Fig. 5. Except in the ways expressly mentioned hereinafter this modification embodies all of the elements and structure described in detail in connection with the preferred form of my invention and is adapted to be mounted on the vehicle body 9 in the same way and in the same locations. In addition, the said elements are positioned and function as described previously. It should be especially noted, however, that the mirror 10 and upper portion of the bracket 15 may possess the structure of the preferred embodiment indicated in Fig. 4 so that the former may be interchangeably positioned on either side of the bracket in the manner already pointed out.

Generally speaking, the present modification differs from the preferred form only in that a rod-like member 27 is integrally associated with or made a part of the metallic portions of my mirror antenna assembly, suitable changes therein being made to receive this member. The member 27 is metallic in character and may be of any size, length, design and structure suitable for use for radio antenna purposes on a vehicle body such, for example, as the conventionally employed telescopic whip-type aerial.

The rod-like member 27 is firmly secured to or within any suitable part of the metallic portions of the mirror assembly and any means suitable for so securing it may be utilized. Preferably, it is fixed in the following way to the bracket 15 which, in the present modification, is preferably bowed or generally concave in shape, as shown, and is flattened along a portion of its outer and upper surface as at 28 to form a substantially horizontally positioned shoulder. Within this shoulder 28 is drilled or otherwise formed a generally vertically extending hole or opening 29 which terminates blindly within the central portion of the bracket 15. The member 27 is inserted within the opening 28 into which it fits. This member may be maintained within the said opening in any suitable way, such as by means of a press fit, by a threaded engagement, by the use of a jam nut either in connection with such thread union or separately, or the like.

It will be readily understood that the present modification operates substantially like the preferred form of the invention, the rod-like member 27 supplying, however, a greater metallic surface for radio receptive purposes. It will also be understood that the present modified structure may be embodied by one or more of the mirror antenna assemblies applied to a single vehicle body and that one or more such units may embody the preferred structure while at the same time others embody the modified one and vice versa.

From the foregoing it will be noted that I have provided a novel antenna for a vehicle radio utilizing the metallic portions of one or more mirrors for the receptive surface thereof. Such metallic portions are insulated from the body of the vehicle and thus provide an antenna free from shielding and one which is easily mounted, is more durable, more attractive in appearance and conducive to safer operation of the vehicle upon which it is mounted.

I claim:

1. For use with a vehicle body having a hinged front door and a body panel in advance of said door; a combined rear vision mirror and radio antenna supporting bracket, said bracket being insulated from the body panel and having a base adapted to be mounted upon the side of said panel, said bracket having an arm extending outwardly and upwardly with respect to said base and having a rear vision mirror including a metal backing secured upon its outer end, whereby, when the bracket is mounted upon the panel, the mirror is spaced outwardly from the vehicle body, said bracket having antenna rod receiving means at a point spaced outwardly and upwardly from said base, and an antenna rod having its lower end secured to said means, whereby, when said bracket is mounted upon said panel, the antenna rod is spaced outwardly from the vehicle body, said bracket, said mirror backing and said antenna rod being in continuous electrical contact and all being adapted to serve as radio antenna means.

2. For use with a vehicle body having a hinged front door and a cowl panel in advance of said door; a combined rear vision mirror and radio antenna supporting bracket, said bracket being insulated from the cowl panel and having a base adapted to be mounted upon the side of said panel, said bracket having an arm extending outwardly and upwardly with respect to said base and having a rear vision mirror including a metal backing secured upon its outer end, whereby, when the bracket is mounted upon the panel, the mirror is spaced outwardly from the vehicle body, said bracket having a vertically disposed socket formed therein at a point intermediate said base and said outer end, and a vertically disposed antenna rod having its lower end secured in said socket, whereby, when said bracket is mounted upon said panel, the antenna rod is spaced outwardly from the vehicle body and inwardly from said mirror, said bracket, said mirror backing and said antenna rod being in continuous electrical contact and all being adapted to serve as radio antenna means.

3. For use with a vehicle body having a hinged front door and a cowl panel in advance of said door; a combined rear vision mirror and radio antenna supporting bracket, said bracket being insulated from the cowl panel and having a base adapted to be mounted upon the side of said panel, said bracket having an arm extending outwardly and upwardly with respect to said base and having a rear vision mirror including a metal backing secured upon its outer end, whereby, when the bracket is mounted upon the panel, the mirror is spaced outwardly from the vehicle body, said bracket having a socket formed therein at a point spaced outwardly and upwardly from said base, an antenna rod having its lower end secured in said socket, whereby, when said bracket is mounted upon said panel, the antenna rod is spaced outwardly from the vehicle body, said bracket, said mirror backing and said antenna rod being in continuous electrical contact and all being adapted to serve as radio antenna means, and a device adapted to pass through the cowl panel for connecting the base thereto and having means at its inner end within the body for attachment to a conductor wire.

4. For use with a vehicle body having a hinged front door and a cowl panel in advance of said door; a combined rear vision mirror and radio antenna supporting bracket, said bracket being insulated from the cowl panel and having a base adapted to be mounted upon the side of said panel, said bracket having an arm extending outwardly and upwardly with respect to said base and having a rear vision mirror including a metal backing secured upon its outer end, whereby, when the bracket is mounted upon the panel, the mirror is spaced outwardly from the vehicle body, said bracket having a socket formed therein at a point spaced outwardly and upwardly from said base, an antenna rod having its lower end secured in said socket, whereby, when said bracket is mounted upon said panel, the antenna rod is spaced outwardly from the vehicle body, said bracket, said mirror backing and said antenna rod being in continuous electrical contact and all being adapted to serve as a radio antenna means, and a bolt insulated from the cowl panel and threaded into said bracket and having a head adapted to receive a conductor wire disposed interiorly of the panel.

LOWELL F. SARNES.